(12) United States Patent
Cherkasova et al.

(10) Patent No.: US 6,865,601 B1
(45) Date of Patent: Mar. 8, 2005

(54) METHOD FOR ALLOCATING WEB SITES ON A WEB SERVER CLUSTER BASED ON BALANCING MEMORY AND LOAD REQUIREMENTS

(75) Inventors: Ludmila Cherkasova, Sunnyvale, CA (US); Shankar Ravindra Ponnekanti, Menlo Park, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 09/502,718

(22) Filed: Feb. 11, 2000

(51) Int. Cl.$^7$ .................. G06F 15/16; G06F 15/173
(52) U.S. Cl. .............. 709/220; 709/202; 709/203; 709/219; 709/223; 709/224; 709/238
(58) Field of Search ............... 709/202, 203, 709/219, 220, 238, 217, 245, 223, 224; 711/134, 120; 707/103, 201

(56) References Cited

U.S. PATENT DOCUMENTS

| | | | | |
|---|---|---|---|---|
| 5,371,852 A | * | 12/1994 | Attanasio et al. | 709/245 |
| 5,774,660 A | * | 6/1998 | Brendel et al. | 709/201 |
| 5,950,205 A | * | 9/1999 | Aviani, Jr. | 707/103 |
| 6,175,869 B1 | * | 1/2001 | Ahuja et al. | 709/226 |
| 6,279,001 B1 | * | 8/2001 | DeBettencourt et al. | 709/217 |
| 6,314,465 B1 | * | 11/2001 | Paul et al. | 709/226 |
| 6,351,775 B1 | * | 2/2002 | Yu | 709/238 |
| 6,374,297 B1 | * | 4/2002 | Wolf et al. | 709/226 |
| 6,424,992 B2 | * | 7/2002 | Devarakonda et al. | 709/203 |
| 6,425,057 B1 | * | 7/2002 | Cherkasova et al. | 711/134 |
| 6,430,618 B1 | * | 8/2002 | Karger et al. | 709/225 |
| 6,434,608 B1 | * | 8/2002 | Desai | 709/217 |
| 6,438,652 B1 | * | 8/2002 | Jordan et al. | 711/120 |
| 6,466,949 B2 | * | 10/2002 | Yang et al. | 707/201 |
| 6,470,389 B1 | * | 10/2002 | Chung et al. | 709/227 |
| 6,697,849 B1 | * | 2/2004 | Carlson | 709/219 |
| 6,718,330 B1 | * | 4/2004 | Zenner | 707/10 |

OTHER PUBLICATIONS philip S. Yu and Danial M. Dias, Scheduling Algorithms for Distributed Web Servers, 1997, IEEE, 0–8186–7813–5/97, Pages 169–176.*

* cited by examiner

Primary Examiner—Joseph H. Feild
Assistant Examiner—Chau Nguyen

(57) ABSTRACT

A method for operating a server cluster that includes N server nodes that service client requests. Each client request is directed to one of a plurality of sites hosted on the server cluster. Each site is identified by a domain name, and each server node is identified by an address on a network connecting the clients to the server nodes. The computational resources required to service the requests to each of the sites over a first time period are measured and used to group the sites into N groups. Each group is assigned to a corresponding one of the server nodes. The groups are chosen such that, for each pair of groups, the difference in the sum of the measured computational resources is within a first predetermined error value. Configuration information defining a correspondence between each of the sites and one or more of the server nodes assigned to the groups containing that site is then provided to a router accessible from the network. The groupings are periodically updated by measuring the computational resources required to service the requests to each of the sites over a second time period; and grouping the sites into N new groups. The new groups are constructed by swapping sites between the previous groups. The new groups are constructed such that, for each pair of new groups, the difference in the sum of the measured computational resources over the second time period is within a second predetermined error value. The new grouping that satisfies the second error condition and for which the new groups differ from the previous groups by as few site swaps as possible is preferred.

12 Claims, 1 Drawing Sheet

METHOD FOR ALLOCATING WEB SITES ON A WEB SERVER CLUSTER BASED ON BALANCING MEMORY AND LOAD REQUIREMENTS

FIELD OF THE INVENTION

The present invention relates to computer servers, and more particularly, to an improved method for distributing web sites over a cluster of computer servers.

BACKGROUND OF THE INVENTION

The World Wide Web ("Web") has become a very successful means of communication between central sites connected to the Internet and individual users on the Internet who wish to communicate with the site. The communications are controlled by two programs, a Web Browser that runs on the user's computer and Web server software that runs on the site's computer. A Web Browser sends a request to a Web Server using the HTTP protocol. A request results in a MIME ("Multipurpose Internet Mail Extensions"—see IETF RFC1341, 1342, 1521) Stream being sent back to the Web Browser. This protocol for communications has become the dominant method for transferring data over wide area networks.

There is seldom an exact match between the computational power needed to service a web site and the server at the specific web site. A large site may require many servers to adequately provide service to the users of that site. In contrast, a small site will require only a fraction of the computing power of a single server. Furthermore, the computational needs of various sites change over time, often from day to day. This mismatch, together with the specialized talents required to maintain the hardware/software of a web site has led to the development of shared web hosting sites.

A shared web hosting service often creates a set of virtual servers on the same server. Unix web servers (Netscape and Apache) are the most flexible in addressing the web hosting problem. In these systems, multiple host (domain) names can be easily assigned to a single IP address. This creates the illusion that each host has its own web server, when in reality, multiple "logical hosts" share one physical host. If a site is too small to completely occupy the resources of a single computer, the site can share a computer with other small sites thereby achieving economies of scale.

If, on the other hand, a site that requires more resources than can be provided by a single computer, the site can be duplicated on several computers of a server cluster. In this case, the site is treated as a number of separate sites. When a request is directed to the domain name associated with the large site, the Domain Name System (DNS) that maps the domain names to the physical computer selects one of the computers in the server cluster that has the site to service the request. Typically, a round-robin algorithm is utilized to spread the requests over the various computers so that the load is more or less evenly balanced.

The quality of the web hosting service can be defined in terms of the latency between the arrival of a request for data on the server and the delivery of that data to the user over the web. The longer the latency, the poorer the service. Typically, a user requests one or more files from the server. The server typically has a disk on which the files for the web site in question are stored and a random access memory (RAM) that is used as a disk cache to reduce the latency. If a requested file is not in RAM, the server must fetch the file from disk into RAM. The latency associated with such cache misses is typically the most significant factor in the overall quality of service provided by the server.

Each web site can be characterized by a working file set. In the simplest case, the in working file set is all of the files that belong to that web site. If the web site is assigned to a server with sufficient memory to allow all the site's files to be resident in the cache, then the server will provide the best possible service for that web site. If, however, the available memory is too small, then a file will be flushed from the cache before it is re-used by a subsequent file request that generated a cache miss. In the worse case, every file request generates a cache miss and the user is effectively supplied data directly from the disk. This subjects the user to the greatest latency and the worst service.

Each web site also imposes a computational workload on the server on which it resides. In the case of simple file transfers, the working load is proportional to the number of bytes of data transferred. If the user requests data that requires other programming chores such as running database queries, the workload will be larger.

One of the main problems in web server cluster management is achieving both efficient RAM usage and workload balancing. The management software that oversees a cluster attempts to distribute web sites over servers such that RAM requirements and workloads are evenly distributed over the servers. That is, given N servers in a cluster that is to service S web sites, the goal of the management software is to partition the S web sites into N groups such that the total working set requirement and computational workload in each group is approximately the same.

Software load balancing on a server cluster is a job traditionally assigned to a Domain Name System (DNS) server. As noted above, when a large web site is duplicated on a number of servers, Round-Robin DNS distributes accesses among the servers in the cluster. When a request is received for such a distributed site, the DNS server returns a list of the IP addresses of the servers assigned to this site, placing a different address first in the list for each successive request. Ideally, different clients (end users making HTTP requests) are mapped to different servers in the cluster.

Ideally, a cluster of N web servers should be N times more powerful than one web server. However, obtaining such a scaleable solution requires overcoming a number of problems. As noted above, Web server performance depends heavily on efficient RAM usage. A web server works faster when it delivers content from the RAM. Moreover, its throughput is much higher too. A difference in throughput of more than a factor of 10 is often observed between servers that supply content from RAM verses servers that supply content from disk.

As noted above, load balancing for a cluster of web servers pursues the goal of equally distributing the load across the servers of the cluster. The simplest solution to the load balancing problem is to distribute accesses equally (or based on workload) to all the servers. Unfortunately, this solution typically interferes with the other important goal of efficient RAM usage. A large site that has been duplicated on several servers has popular files that tend to occupy RAM space in all the nodes serving the site. This redundant replication of "hot" content in the RAMs of all the nodes leaves much less RAM available for the rest of the content, leading to a worse overall system performance. With such an approach, a cluster having N times bigger RAM (which is the combined RAM of N servers) might effectively have almost the same RAM as one server in the cluster, because of replicated content throughout the RAMs in the cluster.

In principle, this situation can be improved by routing requests to servers based on the files requested such that each server assigned to a large site provides a predetermined sub-set of the site's files. Unfortunately, this approach requires data that is not available to the DNS server, namely the files being requested in the message. In addition, such a static partitioning of the site's content will inevitably lead to an inefficient, suboptimal and inflexible solution, since the changes in access rates as well as access patterns tend to vary dramatically over time, and static partitioning does not account for this.

In a co-pending application entitled "*Method for Allocating Web Sites on a Web Hosting Cluster*" (U.S. Ser. No. 09/318,722) which is hereby incorporated by reference, a strategy for partitioning the sites into the server groups is described which avoids unnecessary document replication to improve the overall performance of the system. For each web site hosted on a cluster, this solution evaluates the system resource requirements in terms of the memory (site's working set) and the load (site's access rate). Based on memory and load requirements, the sites are partitioned in N balanced groups and assigned to the N nodes of the cluster respectively. Since each hosted web site has a unique domain name, the desired routing of requests is done by submitting appropriate configuration files to the DNS server.

The success of this method depends on the accuracy with which the sites' working sets and access rates are evaluated. This problem becomes particularly difficult in the presence of sites with large working set and access rate requirements. A large site needs to be replicated on more than one server when a single server does not have enough resources to handle all the requests to this site. The optimal partitioning of the sites depends on knowing how many servers should be assigned to a particular large site, as well as the workload and memory requirements associated with the replicated sites.

In addition, the above-described method assumes that the working set of a site is equal to the sum of the sizes of files belonging to that site. However, in general, some files are accessed so infrequently that these files do not benefit from the RAM cache. In general, to benefit from caching, a file must be requested a second time within a period of time that is determined by the average residency time of a file in the cache. The first time the file is requested, there will be a cache miss, and hence, the cache does not provide any benefit. If the file is requested a second time and the file is still in the cache, the cache provides a significant improvement. However, each time a cache miss occurs, a file from disk overrides a file in the cache. Sooner or later, any given file in the cache will be overwritten. Hence, if the second request for a file arrives after the copy of the file in RAM has been overwritten, another cache miss occurs, and once again the benefits of caching are lost. Hence, it would be advantageous to be able to more accurately measure the working file set of any server in a manner that takes into account the size of the RAM cache and the probability that each file will benefit from caching.

As noted above, the requirements of each of the web sites often change dramatically over time. Hence, any partitioning of the web sites into clusters will only be optimal for some period of time. In principle, the partitioning system monitors the sites' requirements periodically and re-partitions the sites into the groups that are assigned to the various servers in the cluster. However, if a new partition does not take into account the existing "old" partition, it could lead to temporary system performance degradation. When a site is allocated to a new server, none of the content of that site is available in the RAM of the new server, and hence all of the initial file requests will generate cache misses and system performance will be lowered.

Broadly, it is the object of the present invention to provide an improved method for partitioning a plurality of web sites into groups that are each served by a server in a cluster.

It is a further object of the present invention to provide a method that determines the number of servers to be assigned to a web site that is too large to be assigned to a single server.

It is a still further object of the present invention to provide a method that more accurately estimates the working set and computational workload imposed by each web site.

It is yet another object of the present invention to provide an improved method for repartitioning the web sites that minimizes the temporary system degradation described above when the new partition is activated.

These and other objects of the present invention will become apparent to those skilled in the art from the following detailed description of the invention and the accompanying drawings.

SUMMARY OF THE INVENTION

The present invention is a method for operating a server cluster that includes N server nodes that service client requests. Each client request is directed to one of a plurality of sites hosted on the server cluster. Each site is identified by a domain name, and each server node is identified by an address on a network connecting the clients to the server nodes. In the method of the present invention, the computational resources required to service the requests to each of the sites over a first time period are measured and used to group the sites into N groups. Each group is assigned to a corresponding one of the server nodes. The groups are chosen such that, for each pair of groups, the difference in the sum of the measured computational resources is within a first predetermined error value. Configuration information defining a correspondence between each of the sites and one or more of the server nodes assigned to the groups containing that site is then provided to a router accessible from the network. The router provides the address of the server node that is to service the next client request for each site. The sites return files in response to the requests, and the measurement of the computational resources includes recording information identifying each returned file, the size of that file, and the number of times that file was returned. Each server node includes a cache memory for facilitating the return of the files in response to the client requests, and the grouping of the sites also depends on the amount of memory in the cache on each of the servers. Sites are partitioned into groups, each of which is assigned to a node, such that the most popular files of all the sites are distributed equally among all the nodes (in other words for each group, the sum of sizes of the popular files included in that group is nearly the same) and additionally, the computational workload imposed on each node is nearly the same. Sites that require more computational resource than can be efficiently provided by a single server node are replicated on a plurality of server nodes. In the preferred embodiment of the present invention, the groupings are periodically updated by measuring the computational resources required to service the requests to each of the sites over a second time period; and grouping the sites into N new groups. The new groups are constructed by swapping sites between the previous groups. Each new group is assigned to a corresponding one of the server nodes. The groups are constructed such that, for each pair of new groups, the difference in the sum of the measured computational resources over the second time period is within a second predetermined error value. The new grouping that satisfies the second error condition and for which the new groups differ from the previous groups by as few site swaps as possible is the preferred new grouping.

DETAILED DESCRIPTION OF THE INVENTION

Figure 1:
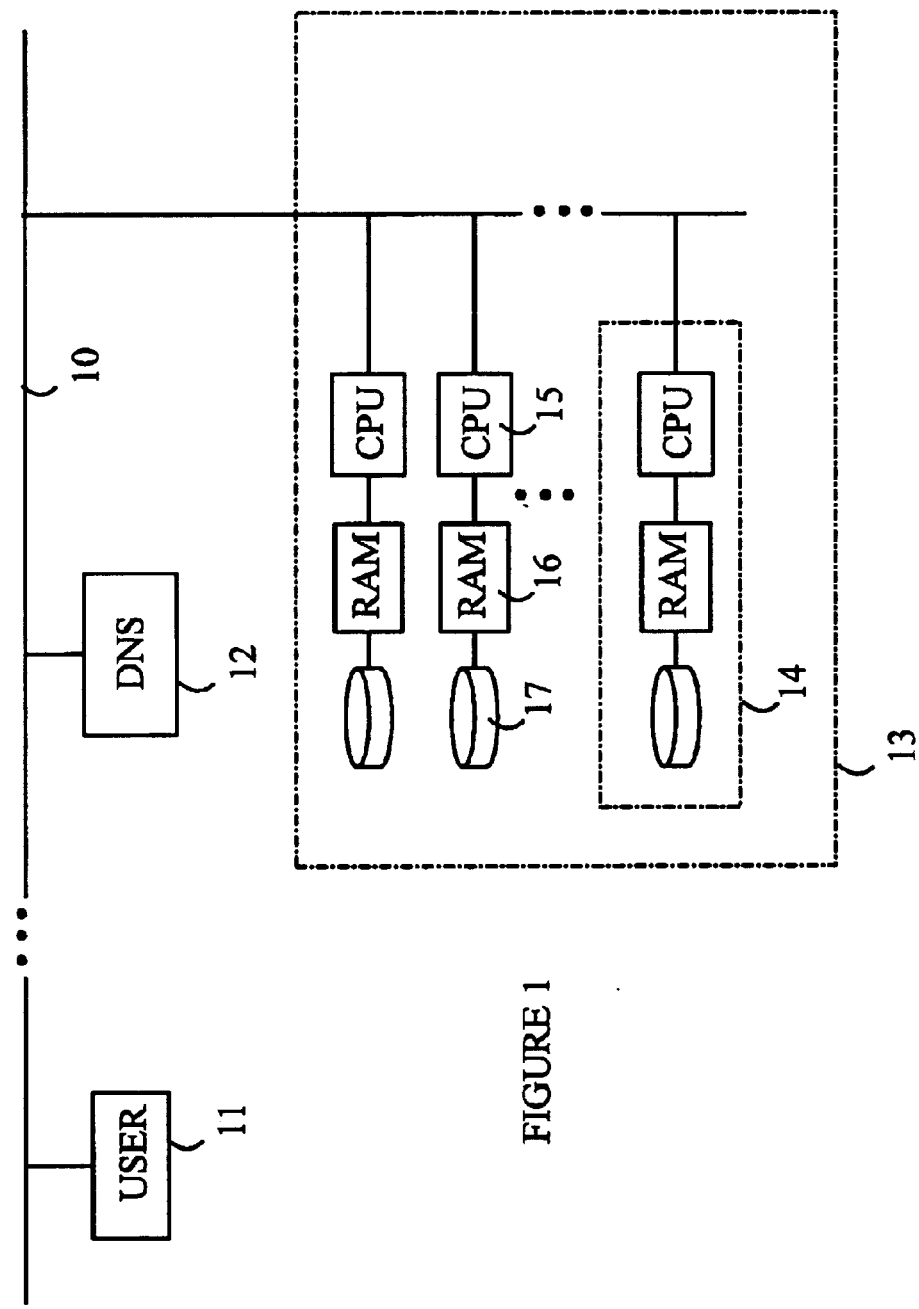
FIG. 1 is a block diagram of a hosting service 13 for hosting a plurality of domains on the Internet 10.

Refer now to FIG. 1, which is a block diagram of a hosting service 13 for hosting a plurality of domains on the Internet 10. To simplify the following discussion, the preferred embodiments of the present invention will be described in terms of a hosting service having a plurality of computers 14, referred to as "nodes" or "servers". Each node services one or more domain names and has an IP address associated with that node. Each node includes a processor 15 having a RAM disk cache 16 for facilitating access to files stored on a disk 17. The mapping of IP addresses to domain names is assumed to be handled by DNS 12, which provides the user 10 with the IP address of the node in host 13 that is to service that user's request. If a site is too large to be serviced by a single node, the site is replicated on a plurality of nodes, and the DNS server uses an algorithm such as the round-robin algorithm discussed above to distribute requests for that site's files across the relevant nodes.

In a host management system according to the present invention, at any given time, each domain is characterized by a working file set and workload. For each hosted web site s, a "site profile" is built by evaluating the number of bytes of data transferred over some time period P, denoted by A(s) and referred to as the "access rate for site s". The combined size, in bytes, of all files accessed during P, denoted by W(s) and referred to as the "working set for site s" is also computed. In addition, the number of times each file was accessed during time period P is also accumulated. This frequency data is kept in a table FR(s) whose entries are the file name, number of times the file was accessed, and the size of the file. The table entry for file f will be denoted by the triplet (f, $fr_f$, $size_f$), where, $fr_f$ and, $size_f$ are the access frequency and the size of the file f respectively.

A(s) is the principal factor that characterizes the computational workload on a system due to the traffic to site s. The working set W(s) characterizes the memory requirements of site s. These parameters provide a high level characterization of the hosted web sites and their system resource requirements.

Let N be the number of nodes in the web server cluster. It will be assumed that all nodes are identical in the following discussion. However, it will be obvious to those skilled in the art from the following discussion that the method of the present invention can be extended to hosts having nodes of different capacities. The goal of the present invention is to partition all the hosted web sites into N groups: $C_1, \ldots, C_N$ such that the cumulative access rates and cumulative working sets of each of these N groups is approximately the same.

In a host system according to the present invention, a site having W(s) or A(s) that is too large to be served by a single node alone is replicated on a number of different nodes. The replicated sites are treated as if they belonged to different domains. However, no two replicates are ever placed on the same node. If the site is replicated on k servers, the number of bytes that must be supplied by each server is reduced by a factor of k, i.e., the site access rate is reduced by a factor of k. When a site is replicated on k servers, the working set of this site on each of these k servers is expected to be less than the working set of the unreplicated site W(s) because some files of this site might never be accessed on some of these k servers. In the following discussion, the working set on each of the k servers of a site s replicated on these k servers will be denoted by W(s#k). Similarly, the access rate of each of these k logical sites will be denoted by A(s#k). Thus, the total working set and access rate of a replicated site s on all the k servers is given by kW(s#k) and kA(s#k). It should be noted that W(s#1)=W(s) and A(s#1)=A(s).

To clarify the following discussion, the new working set and new access rate for each site s are defined as follows:

$$NewW(s) = \begin{cases} W(s) & \text{if the site is put on one server} \\ k*W(s\#k) & \text{if the site is put on } k > 1 \text{ servers} \end{cases}$$

Similarly, $$NewA(s) = \begin{cases} A(s) & \text{if the site is put on one server} \\ k*A(s\#k) & \text{if the site is put on } k > 1 \text{ servers} \end{cases}$$

The total working set and the total access rate of all the sites are computed as follows:

$$TotalW = \sum_{all\ sites} NewW(s)$$

and $$TotalA = \sum_{all\ sites} NewA(s)$$

Thus, the mean working set and access rate per server are defined by:

$$MeanW = \frac{TotalW}{N}$$

and $$MeanA = \frac{TotalA}{N}$$

where N is the number of servers in the cluster.

Having provided the above definitions, in the preferred embodiment of the present invention, a site s is replicated when either $W(s) > \text{alpha} * MeanW$ or $A(s) > \text{beta} * MeanA$, where alpha and beta are two thresholds in the range between 0 and 1. Typical values of alpha and beta to create a good balanced solution are in the range of 0.5 to 0.9. In the preferred embodiment of the present invention, 0.7 is assigned to these variables. Let Copies(s) denote the number of times a site is replicated, and recall that s#1 is the same as s. The following pseudo code finds the correct number of copies for site s.

```
Set Copies(s) = 1 for all the sites s.
find MeanW and MeanA
do
    done = true
    for s = 1 to NumSites
        if (W(s#Copies(s)) > alpha*MeanW or A(s#Copies(s)) >
        beta*MeanA) and Copies(s) < N{
            Copies(s) = Copies(s) + 1;
            done = false;
            recompute NewW(s), NewA(s),
            MeanW and MeanA
        }
while done = false
```

It should be noted that this algorithm will result in a site being replicated across all N nodes unless there is a smaller number of copies for which W(s#Copies(s))<alpha*MeanW and A(s#Copies(s))<beta*MeanA.

To further simplify the following the discussion, the above described parameters will be normalized as follows:

If a site s is put on a single server, set $$W(s) = \frac{W(s) * N * 100}{TotalW}$$

If a site s is replicated across k servers, set $$W(s\#k) = \frac{W(s\#k) * N * 100}{TotalW}$$

Similarly, $$A(s) = \frac{A(s) * N * 100}{TotalA}$$

and $$A(s\#k) = \frac{A(s\#k) * N * 100}{TotalA}$$

With the normalization, both the total access rate and the total working set of all the sites is equal to N*100. With this normalization, the goal of the host management system is to partition the web sites in N balanced groups with cumulative (normalized) working sets and access rates of 100 units each. Each of these balanced groups is then assigned to a node.

The above-described algorithm for replicating a web site on multiple servers as well as the algorithms discussed below for partitioning the web sites into balanced groups depend on knowing W(s#k) and A(s#k). The more accurately these quantities are known, the better the partitioning of the web sites into groups. In the preferred embodiment of the present invention, there are four different methods by which estimates can be obtained for these quantities depending on the computational resources that are to be allocated to this determination.

The simplest, but least accurate, method is to simply set:

$$A(s\#k) = \frac{A(s)}{k}$$

and $$W(s\#k) = W(s),$$

where k is the number of servers the site s is replicated across. This method also requires the fewest computational resources. In this approximation, each of the k nodes experiences $1/k^{th}$ of the total load (traffic) generated by site s. However, the working set (memory requirements) of site s for each of k nodes is equal to the original working set with no reduction.

The second method improves on this estimate by keeping track of the frequency with which the individual files associated with site s are actually accessed. This additional information allows one to better estimate the possible reduction of the working sets caused by replication. Intuitively, if some files of the site s are accessed only a few times during the measurement period, then the probability that these files are accessed on all the k servers on which the site s was replicated diminishes as k increases. This leads to a smaller estimate for the working set on each of the k servers. The additional information is obtained from the file access logs described above. That is, for each file f of site s, the access frequency $fr_f$(the number of times this file was accessed during the observed period P) and the file size $size_f$ (in bytes) are known.

Let a site s be replicated across k nodes. Intuitively, if file f is accessed at least once during the relevant period on a given node, this file "contributes" its size to the site working set on this node. In order to estimate W(s#k), the probability p(k,f) that the file f is accessed at least once on one of these k servers in the period P must be computed from the file access frequency data. Assuming independence of accesses and that all accesses are equally likely to go to any server, this probability is given by $$p(k, f) = 1 - \left(1 - \frac{1}{k}\right)^{fr_f}$$

and $$W(s\#k) = \sum_{\text{all files } f \text{ of site } s} \left[1 - \left(1 - \frac{1}{k}\right)^{fr_f}\right] * size_f$$

In addition, it is assumed that $$A(s\#k) = \frac{A(s)}{k}$$

in this embodiment of the present invention.

The remaining methods depend on the size of the RAM utilized for the disk cache and on the replacement policy utilized for overwriting files that are currently in the cache when a new file must be brought into the cache in response to a cache miss. Based on the size of the cache, these methods make better estimates of the working set or the memory requirements of each site. A file that is accessed very infrequently is unlikely to be in the disk cache, and hence, should not be included in the working set of a site. The average time between file accesses for a file f is $1/fr_f$.

Hence if $1/fr_f \gg T$, where T is the average replacement time for a file in the cache, f shouldn't be included in the working set for the site in question. Thus, the site files are separated into files that are infrequently accessed and are expected to be accessed from disk, and hence, not included in the working set and files that are more frequently accessed and are expected to be in the cache. The latter files define a substantially smaller working set that is a better estimate. These methods also use a better estimate of the load by distinguishing bytes coming from disk and bytes coming from memory because bytes coming from disk impose a higher computational load. This improved estimate of the load is used in place of the simple estimate consisting of the access rate.

Let Ram be the size of the memory (RAM) in each node. Since there are N nodes in the cluster, total cluster memory Ram=ram *N. Let B(s,fr) be the number of bytes of site s that are accessed with frequency fr in the period P. In other words, B(s,fr) is the sum of sizes of files that are accessed with frequency fr in period P.

Let $$C(s, fr) = \sum_{all\ fr' \geq fr} B(s, fr')$$

Then, the smallest frequency $fr^{opt}$ such that $$\sum_{all\ sites\ s} C(s, fr^{opt}) \leq Ram$$

defines the "most popular Ram-based bytes" from all the sites.

The third embodiment of the present invention is based on the assumption that the best performance is achieved when the "most popular" bytes reside in memory, and that the operating system replacement policy ensures that the most popular bytes are kept in memory at all times. Given these assumptions, it can be easily seen that when the sites are distributed on a cluster of identical nodes with total memory Ram, the best performance is achieved when the most popular bytes are distributed equally on all nodes.

Given the optimum cut-off frequency $fr^{opt}$ the contribution of site s to the most popular Ram bytes is $C(s,fr^{opt})$, and thus the working set requirement of site s is $W(s)=C(s,fr^{opt})$.

The remaining bytes for site s are not among the most popular Ram bytes and are expected to be fetched from the disk. It should be noted that the computational workload needed to retrieve a file from disk is greater than workload imposed by supplying the file from memory. Accordingly, the estimate for A(s) is also updated in these embodiments of the present invention. In the following discussion, $$DiskWeight = \frac{\text{Workload imposed by disk access}}{\text{Workload imposed by memory access}}$$

In other words, for the accesses coming from the disk, an additional cost of (DiskWeight−1) per byte is incurred.

Let Y(s) be the total number of bytes of site s transferred during period P. This was the approximation used for A(s) in the preceding two embodiments of the present invention. Note that $$Y(s) = \sum_{fr} fr * B(s, fr).$$

It is assumed that $C(s,fr^{opt})$ bytes of site s are served from memory (RAM) while the rest of the bytes of this site come from disk. The number of bytes of site s that come from disk is given by $$D(s, fr^{opt}) = \sum_{fr < fr^{opt}} fr * B(s, fr)$$

Hence, $$A(s)=Y(s)+D(s,fr^{opt})*(\text{DiskWeight}-1)$$

Note that A(s)=Y(s) when DiskWeight=1.

The above estimate assumed that the site was not replicated. If a site s is replicated on k servers, the number of bytes accessed with frequency greater than or equal to fr on each server is given by $$C(s\#k,fr)=C(s,k*fr)$$

This last expression is based on the simplifying assumption that the requests to a site are distributed exactly equally on all the servers on which that site is replicated.
and $$B(s\#k,fr)=C(s\#k,fr)-C(s\#k,fr+1)$$

The above equations are used to calculate $fr^{opt}$, $D(s,fr^{opt})$ and the working sets and access rates for all the sites in cases where one or more sites are replicated.

In the fourth embodiment of the present invention, an estimate is made for the mean replacement cycle in the cache. Here again, B(s,fr) is computed for each site s and all frequencies fr from the file access logs. A simple analytical model is used to calculate a time period T such that the sum of sizes of distinct files accessed from all the sites in time T is equal to Ram bytes. In other words, this is an approximation for the period for one LRU cycle, since a file that is accessed at time t is expected to be evicted at time t+T if it is not accessed again.

In order to calculate T, the request arrival distribution is assumed to be Poisson. That is, for the B(s,fr) bytes of site s that were accessed with frequency fr, the arrival rate is Poisson with fr expected arrivals in period P. The probability that a byte, that is accessed fr times in period P, is accessed at least once in period T is given by $$1 - e^{-\frac{fr*T}{P}}$$

Hence, the following equation must be solved for T/P.

$$\sum_{s,fr} B(s, fr) * \left(1 - e^{-\frac{fr*T}{P}}\right) = Ram$$

Note that a byte of site s is expected to be in memory if it is accessed at least once in the period T. Hence, the working set of site s is more accurately given by $$W(s) = \sum_{fr} B(s, fr) * \left(1 - e^{-\frac{fr*T}{P}}\right)$$

Again, let Y(s) be a total number of bytes of site s transferred during period P.
Recall that $$Y(s) = \sum_{fr} fr * B(s, fr)$$

All the bytes of site s that are not in W(s) come from the disk. The number of bytes of the site s transferred from disk is given as:

$$D(s) = \sum_{fr} fr * B(s, fr) * e^{-\frac{fr*T}{P}}$$

and $$A(s) = Y(s) + (DiskWeight - 1) * D(s)$$

If a site s is replicated across k servers, $$W(s\#k) = \sum_{fr} B(s, fr) * \left(1 - e^{-\frac{fr*T}{k*P}}\right)$$

$$D(s\#k) = \sum_{fr} fr * B(s, fr) * e^{-\frac{fr*T}{k*P}}$$

$$Y(s\#k) = \frac{Y(s)}{k}$$

$$A(s\#k) = Y(s\#k) + (DiskWeight - 1) * D(s\#k)$$

Having provided the above-described methods for estimating the working set and workload imposed on a node by a site s, the manner in which the sites are initially assigned to nodes will now be explained in more detail. As noted above, the goal of the partitioning strategy is to distribute the web sites across the N nodes such that each node has the same total working set requirements and the same computational workload requirement. Initially, this is performed at system startup so as to provide the best overall balance. Once a good working partition has been established, the partition is adjusted at periodic intervals.

As noted above, system efficiency can suffer when the hosting system changes from one partition to another if a large number of web sites are moved to different nodes. When a web site is moved from one node to another, none of its working set is expected to be in the memory of the node receiving the web site. Hence, that node will suffer a large number of cache misses in the beginning. Eventually, the memory on the receiving node will acquire the working set of the new web site, and the efficiency of that node will return to normal. To minimize this temporary loss of efficiency, the adjustment is performed in a manner such that the new partitioning of the web sites is close to the previous partition.

The manner in which the original partition is constructed will now be explained in detail. The partitioning method operates by creating a large number of random partitions in which the working sets are balanced. The final partition is selected from these by finding the partition in which the access rates are closest to the ideal balance.

For the purposes of this discussion, the following quantities are defined as provided below.

NumCustomers=number of web sites hosted on the web cluster

NumServers=number of nodes (servers) in the web cluster

CustomerWS[i]="working set" for the i-th web site. Without loss of generality, it is assumed that the array CustomerWS[i] is ordered.

CustomerRate[i]—an array which provides the access rates to the i-th web site.

Since the working sets and access rates are normalized, that is, $\Sigma_i\{CustomerRate[i]\}$=NumServers*100 and $\Sigma_i(customerWS[i])$=NumServers100, the goal of the partitioning algorithm is to find the partition for which the cumulative working sets and access rates in each of those groups $C_i$ is close to 100 units each.

In the pseudo-code discussed below, the following additional parameters are used:

CustomerLeftList—an ordered list of customers which are not yet assigned to the servers. In the beginning, the CustomersLeftList is the same as the original ordered list of customers CustomersList;

ServerAssignedCustomers[i]—the list of customers which are assigned to the i-th server;

ServerWS[i]—the cumulative "working set" of the customers currently assigned to the i-th server;

ServerRate[i]—the cumulative "access rate" of the customers currently assigned to the i-th server.

abs_dif(x,y)—the absolute difference between x and y.

The assignment of the customers to all the servers except the last one is done according to the following pseudo-code applied in a cycle to the first NumServers-1 servers. All the web sites that are left in CustomersLeftList are assigned to the last server.

```
/*
* assign customers to the i-th server from the CustomersLeftList
        * using random function until the addition of the chosen
          customer
        * content does not exceed the ideal content limit per server 100.
        */
        customer = random(CustomersLeftList);
        if (ServerWS[i] + CustomerWS[customer] <= 100) {
            append (ServerAssignedCustomers[i], customer);
            remove (CustomersLeftList, customer);
            ServerWS[i] = ServerWS[i] +
            CustomerWS[customer];
            ServerRate[i] = ServerRate[i]+
            CustomerRate[customer];
        }
        else {
/*
* if the addition of the chosen customer content exceeds
* the ideal content limit per server 100
* try to find such a last_customer from the CustomersLeftList
* which results in a minimum deviation from the SpaceLeft
* on this server.
*/
        SpaceLeft = 100 − ServerWS[i];
        find last_customer with minimum
(abs_diff(SpaceLeft_CustomersWS[last_customer]));
        append(ServerAssignedCustomers[i], last_customer);
```

```
        remove (CustomersLeftList, last_customer);
        ServerWS[i] = ServerWS[i] + CustomersWS[last_customer];
        ServerRate[i] = ServerRate[i] +
        CustomersRate[last_customer];
    }
    if (ServerWS[i] > 100) {
/* small optimization at the end: returning the customers with smallest
* working sets back to the CustomersLeftList until the deviation
* between the server working set ServerWS[i] and the ideal content
* per server is Even is minimal.
*/
        if (abs_dif(100 -
        (ServerWS[i] - CustomerWS[redundant_customer])) <
            abs_dif(100 - (ServerWs[i])) {
            append(CustomerLeftList, redundant_customer);
            remove(ServerAssignedCustomers[i], redundant_customer);
            ServerWs[i] = ServerWs[i] +
            CustomerWs[redundant_customer];
            ServerRate[i] = ServerRate[i] +
            CustomersRate[redundant_customer];
        }
    }
```

The above code carries out one iteration of the algorithm, resulting in the assignment of all the web sites to the node servers in balanced groups with respect to the working set requirements of the web sites. Typically, this algorithm generates a very good balancing with respect to the cumulative "working sets" of the web sites assigned to the servers because of the manner in which the groups are constructed.

The second goal is to balance the cumulative access rate per server. This goal is achieved by repeating the above procedure to generate additional partitions and then keeping the partition that best satisfies this second condition. For this purpose, for each partition P generated by the above algorithm, the rate deviation of P from the ideal cumulative access rate is computed according to:

$$RateDeviation(P) = \sum_{i=1}^{NumServers} abs\_dif(100, ServerRate[i])$$

A partition, $P_1$, is defined to be better rate-balanced than partition $P_2$ if and only if $RateDeviation(P_1) < RateDeviation(P_2)$.

The host management algorithm is programmed to generate partitions according to the rules shown above. The number of iterations is prescribed by the input parameter Times. On each step, the algorithm keeps a generated partition only if it is better rate-balanced then the previously best partition found in the previous iterations. It should be noted that other measures of the rate deviation can be utilized without departing from the teachings of the present invention so long as the measure is a monotonic function of the deviation of the access rates imposed on the nodes from the ideal balanced case.

As noted above, the present invention monitors the working sets and access rates of the various web sites periodically to determine if a re-partitioning of the web sites among the N nodes is needed. However, rather than computing a totally new partition using the algorithm discussed above, the present invention looks for a new partition by looking for minimal changes in the assignments of the web sites to the various clusters. While the new partition is not necessarily the best possible partition, if it is close enough, the improvements in the startup efficiency override any loss in overall efficiency.

The preferred algorithm operates by finding partitions that are balanced within some error estimate, dev, and then picks that partition that is the closest to the existing partition. The algorithm uses the normalized working sets and access rates; hence, a partition is balanced to within dev if, for each server, the sum of the working sets of all web sites on that server is within 100± dev and the sum of the access rates of all sites on that server is 100± dev.

The algorithm makes NumSolutions iterations to find partitions balanced to within dev and then picks that partition among those found that has the smallest distance to the existing partition. The "distance" between two partitions, R and Q measures the number of times a site is present on a server in partition R such that the same site is not present on the same server in partition Q.

In each iteration, to find a partition satisfying dev, the algorithm starts with the existing partition and swaps sites (at most NumAtempts times) across servers trying to obtain a partition that satisfies dev. If, in less than or equal to NumAttempts swaps, a partition is obtained that satisfies dev, then this iteration is successful. Otherwise, this iteration is a failure.

After NumSolutions iterations, assume that K partitions satisfying dev are found. Note that K<NumSolutions. If K=0 (that is, no partition satisfying dev was found), then dev is increased and the whole process is repeated.

The preferred algorithm has as its inputs, the old partition, $R_{old}$ and the current working set and access rate data. The partition data includes, for each server S, a list sites(S), which contains the web sites assigned to this server. Similarly, for each site s, the old partition includes an array, servers(s), defining the servers on which site s is replicated, and count(s), the number of servers on which site s is replicated, i.e. count(s)=Copies(s).

The currently measured values for the working sets, access rates, etc. are provided in an object, Reqs, that contain the following information for each site s:

count(s)—the number of servers on which site s is replicated;
  W(s#k), where k=count(s);
  A(s#k), where k=count(s).

The pseudo code given below for the preferred algorithm uses the following definitions and notations:

Let R be a partition, and Reqs be the working set and access rate requirements of the new partition. Capital letters X, Y, etc, are used to refer to servers and small letters p, q, r, s etc. are used to refer to web sites. Note that "site r" is used here for either s or s#k.

1. For a partition R, site p and server X, $R.contains(X,p)=true$ if and only if server X is one of the servers allocated to the site p.

2. Let R.W(X) denote the total memory needed for all the sites assigned to server X, and R.A(X) denote the sum of access rates of all the sites assigned to server X.

$$R.W(X) = \sum_{\text{all } s \text{ such that } R.contains(X,s)} Reqs.W(s\#count(s))$$

$$R.A(X) = \sum_{\text{all } s \text{ such that } R.contains(X,s)} Reqs.A(s\#count(s))$$

3. For servers X and Y, the R.Deviation(X,Y) is defined as follows $|R.W(X)-R.W(Y)|+|R.A(X)-R.A(Y)|$ 4. For servers X, Y and sites p,q, R.swap(p,q,X,Y) is the new partition obtained by swapping the sites p and q between servers X and Y. R.swap(p,q,X,Y) is defined only if site p is present on server X and site q is present on server Y. One of p or q may be 0. Also note that R.swap (0,q,X,Y) denotes the partition obtained by moving q from Y to X and R.swap(p, 0,X,.Y) denotes the partition obtained by moving p from X to Y.
5. For servers X,Y and sites p,q on servers X and Y respectively, the function Benefit is defined as follows:

$$R.Benefit(p,q,X,Y) = R.swap(p,q,X,Y).Deviation(X,Y) - R.Deviation(X,Y)$$

This definition also holds if one of p or q is 0.
6. For partitions R and Q $$distance(R, Q) = cardinality(M)$$

where M={(p,X)| such that Q.contains(X,p)=true and R.contains(X,p)=false} In words, distance(R,Q) measures the number of times a site is present on a server in partition R such that the same site is not present on the same server in partition Q.
7. For a partition R and a real number dev, define satisfies as follows:

$$R \text{ satisfies } dev = \text{true if} |R.W(X) - 100| < dev \text{ and } |R.A(X) - 100 < dev$$

8. SET contains the set of all "good" partitions found so far.

The following pseudo code defines the preferred algorithm for finding a new partition that is balanced to within dev and is closest to the old partition.

```
dev = 0
SET = NULL
while (SET == NULL)
    dev += 5;
    for i = 1 to NumSolutions do
        R = P;/* make a copy of P */
        if (Reqs.count(p) != R.count(p) for some site p)
            randomly add/drop servers from R.servers(p) to make
                R.count(p) = Reqs.count(p);
        for j = 1 to NumAttempts do
            if i <= NumSolutions/10
                pick X and Y such that R.Deviation(X,Y) is
                    maximum;
                pick two sites p and q (one of them could be 0) such
                    that R.benefit (p,q,X,Y) is maximum;
                R = R.swap(p,q,X,Y);
            else if (i <= 4 * NumSolutions)/10)
                pick X and Y such that R.Deviation (X,Y) is
                    maximum;
                pick two sites (one of them could be 0) such
                    that probability of picking p and q is proportional
                    to R.benefit (p,q,X,Y) ;
                R = R.swap(p,q,X,Y)
            else if (i <= 7 * NumSolutions/10)
                pick two servers such that the probability of picking
                    X and Y is proportional to R.Deviation(X,Y);
                pick two sites p and q (one of them could be 0)
                    such that R.benefit(p,q,X,Y) is maximum;
                R = R.swap(p,q,X,Y);
            else
                rand = random number in 0 . . . 1;
                if(rand > 0.9)
                    pick X and Y such that R.Deviation(X,Y) is
                        maximum
                else
                    pick two servers such that the probability
```

-continued

```
                    of picking X and Y is proportional to
                        R.Deviation(X,Y);
                if (rand >0.9)
                    pick two sites p and q (one of them could be 0)
                        such that R.benefit(p,q,X,Y) is maximum;
                    R = R.swap(p,q,X,Y);
                else
                    pick two sites (one of them could be 0) such that
                        probability of picking p and q is proportional
                        to R,benefit(p,q,X,Y)
                    R = R.swap(p, q, X, Y)
        endfor
        if (R satisfies dev)
            SET = SET union {R}
    endfor
endwhile
R' = {R | R belongs to SET and distance (R_old,R) is minimum}
end Algorithm
```

The pseudo code shown above utilizes various constants at a number of branch points. While the constant values shown represent the preferred values for these constants, it should be noted that other values may also be utilized without deviating from the teachings of the present invention.

In the above code, the "probability of picking sites p and q is proportional to R.Benefit(p,q,X,Y)", means that the probability of picking sites p and q is given by $$P(p, q) = \frac{R.Benefit(p, q, X, Y)}{R.TotalBenefit(X, Y)}$$

where $$R.TotalBenefit(X, Y) = \sum_{\text{all site pairs } r,s} R.Benefit(r, s, X, Y)$$

and where sites r and s are chosen such that R.swap(r,s,X,Y) is a valid operation.

Similarly, "probability of picking X and Y is proportional to R.Deviation(X,Y)", means that the probability of picking servers X and Y is given by $$P(X, Y) = \frac{R.Deviation(X, Y)}{R.TotalDeviation}$$

where $$R.TotalDeviation = \sum_{\text{all server pairs } X,Y} R.Deviation(X, Y)$$

Various modifications to the present invention will become apparent to those skilled in the art from the foregoing description and accompanying drawings. Accordingly, the present invention is to be limited solely by the scope of the following claims.

What is claimed is:

1. A method for operating a server cluster comprising N server nodes to service client requests, each client request being directed to one of a plurality of sites hosted on said server cluster, each site being identified by a domain name and each server node being identified by an address on a network connecting said clients to said server nodes, said method comprising the steps of:

measuring the computational resources required to service said requests to each of said sites over a first time period;

grouping said sites into N groups, each group being assigned to a corresponding one of said server nodes such that for each pair of groups, a difference in the sum of said measured computational resources is within a first predetermined error value; and providing configuration information to a router accessible from said network, said information defining a correspondence between each of said sites and one of said server nodes assigned to one of said groups containing that site, said router providing said address of said server node in response to a message specifying said domain name of said site.

2. The method of claim 1 wherein said router is a Domain Name System (DNS) server.

3. The method of claim 1 wherein said sites return files in response to said requests, and wherein said step of measuring said computational resources comprises recording information identifying each returned file, the size of that file, and the number of times that file was returned.

4. The method of claim 3 wherein each of said server nodes comprises a cache memory for facilitating the return of said files in response to said request and wherein said step of grouping said sites also depends on the amount of memory in said cache memory on each of said servers.

5. The method of claim 4 wherein said groups are chosen such that said files returned during said first time period more than a predetermined number of times can be stored simultaneously in said cache memory.

6. The method of claim 3 wherein said measurement of said computational resources further comprises measuring the number of bytes of data returned in response to said requests for each site during said first time period.

7. The method of claim 6 further comprising estimating the number of bytes of data returned directly from said cache memory in servicing said requests for each site during said first time period.

8. The method of claim 1 wherein one of said sites belongs to two of said groups.

9. The method of claim 1 wherein one of said sites belongs to all of said groups.

10. The method of claim 1 wherein said router selects which of said service nodes corresponding to said two groups will service a request for that site.

11. The method of claim 1 further comprising the steps of:

measuring the computational resources required to service said requests to each of said sites over a second time period; and grouping said sites into N new groups, by swapping sites between said previous groups, each new group being assigned to a corresponding one of said server nodes such that for each pair of new groups, the difference in the sum of said measured computational resources over said second time period is within a second predetermined error value.

12. The method of claim 11 wherein said new groups differ from said previous groups by as few site swaps as possible.

* * * * *